United States Patent
Kuse et al.

(10) Patent No.: US 7,158,339 B2
(45) Date of Patent: Jan. 2, 2007

(54) RECORDING/ REPRODUCING METHOD AND RECORDING/REPRODUCING APPARATUS FOR MAGNETIC TAPE

(75) Inventors: Sadamu Kuse, Ibaraki (JP); Manabu Nose, Ibaraki (JP); Shihoko Takashima, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 11/236,536

(22) Filed: Sep. 28, 2005

(65) Prior Publication Data

US 2006/0072235 A1  Apr. 6, 2006

(30) Foreign Application Priority Data

Sep. 30, 2004  (JP)  ............... 2004-287969

(51) Int. Cl.
  *G11B 5/584* (2006.01)
  *G11B 17/00* (2006.01)
  *G11B 27/36* (2006.01)

(52) U.S. Cl. .............. 360/77.12; 360/31; 360/71; 242/334

(58) Field of Classification Search .............. None
  See application file for complete search history.

(56) References Cited

U.S. PATENT DOCUMENTS 3,535,441 A  * 10/1970  Grace .................. 360/70
6,690,535 B1 * 2/2004  Wang ................ 360/77.12
2004/0141250 A1 * 7/2004  Harper et al. .......... 360/71

FOREIGN PATENT DOCUMENTS

| JP | 2001006461 A | * | 1/2001 |
| JP | 2001-35046 A | | 2/2001 |
| JP | 2002-157722 A | | 5/2002 |
| JP | 2003-173508 A | | 6/2003 |

* cited by examiner

*Primary Examiner*—Andrew L. Sniezek
(74) *Attorney, Agent, or Firm*—Birch, Stewart, Kolasch & Birch, LLP

(57) ABSTRACT

A recording/reproducing method and a recording/reproducing apparatus for magnetic tapes are provided as a recording/reproducing technique suitable for recording density enhancement of magnetic tapes. The method and apparatus are capable of correctly recording and reproducing data without causing errors even with occurrence of size changes in the widthwise direction of a magnetic tape. In the recording/reproducing method for magnetic tapes in which data tracks and servo tracks are provided, a tape width is detected and a value of the tape width is stored during data recording, and data reproduction is performed while tape tension is controlled so that the tape width during data reproduction is maintained equal to the tape width during data recording.

2 Claims, 4 Drawing Sheets

RECORDING/ REPRODUCING METHOD AND RECORDING/REPRODUCING APPARATUS FOR MAGNETIC TAPE

BACKGROUND OF THE INVENTION

The present invention relates to a recording/reproducing method and a recording/reproducing apparatus for magnetic tapes, the method and apparatus being capable of managing size changes of magnetic tapes.

Magnetic tapes are used in various applications such as audio tapes, video tapes and computer tapes. Particularly in the field of data backup tapes, magnetic tapes having recording capacities of several hundreds of gigabytes or more per reel have been commercialized along with increasing mass storage of hard disks, which are targeted for gigabyte backup. Further, mass-storage backup tapes which will go beyond 1 terabytes from this time forward have been proposed, for which implementation of higher recording densities is indispensable.

With a view to increasing the capacity of data that can be recorded on a magnetic tape, it has been in progress to increase the number of data tracks by reducing the width of a data track, which is so called recording density enhancement of data tracks. For example, with a magnetic tape having a width of ½ inch (about 12.7 mm), the number of data tracks reaches about several hundreds of tracks, causing the width of data tracks to be as narrow as 20 μm or less.

In parallel with this, the head for recording and reproducing data on a magnetic tape is provided by adopting a multichannel head in which a plurality of magnetic heads are disposed on a head unit. In the multichannel head, a tracking servo technology have been introduced so as to allow each magnetic head to accurately trace on each data track of narrow width. This is a technology that a servo signal previously written on the magnetic tape is read by a servo head provided in the head unit and then an actuator is driven according to the read signal so that even if the track position has changed widthwise during recording and reproducing operation, the head unit can be positionally controlled in the widthwise direction of the magnetic tape, thus enabling each magnetic head to follow each data track.

Such tracking servo technologies come in two kinds of methods. One of the technologies is the magnetic servo method, which includes forming a servo signal on a magnetic layer by magnetic recording and reading this signal magnetically to do servo tracking. The other is the optical servo method, in which a servo signal made from a recessed portion array is formed on a back layer by laser irradiation and then read optically to perform servo tracking.

A description is given below about the tracking servo method by taking the magnetic servo method as an example. FIG. 1 schematically shows a relative positional relation between a magnetic tape 1 and a head unit 2 in this case, and FIG. 2 schematically shows the structure of the head unit 2. As shown in these figures, a servo track group 4 in which servo signals have been written is provided on the magnetic layer of the magnetic tape 1. On the head unit 2, on the other hand, normally provided are at least one servo head 12a/12b and a plurality of data head groups 11 for higher data transfer rate. In recording and reproducing operations, the head unit 2 runs on the magnetic tape 1 in a longitudinal direction X. In this operation, if the magnetic tape 1 has swung in the widthwise direction (Y direction in FIG. 1), the signal derived from the servo head 12a/12b that traces the servo track changes and the actuator (not shown) is activated responsively, by which the whole head unit 2 is moved in the widthwise direction (Y direction) of the magnetic tape 1, with the result that the positional relation between the magnetic tape 1 and the head unit is recovered correctly.

One example of such tracking servo technologies is described in JP 2002-157722 A. In this case, the head unit is equipped with not only a normal servo track reading head but also a preceding reading head that reads positional information about the servo track, with a view to further improving the tracking servo precision.

In this connection, the magnetic tape slightly varies in the size of width along the longitudinal direction, and the amount of the variation changes depending on temperature, humidity and the preservation state of tapes. Also, there are errors of relative positions among the magnetic heads on the head unit because of limitations of machining precision. Such width variations of magnetic tapes and errors of the relative positions among the magnetic heads as shown above, it could be predicted, have large influences on the tracking precision against further enhancement of the density of data tracks 3 of magnetic tapes. This is an issue that could not be managed only by the tracking servo technology for controlling the position of the head unit in the widthwise direction of the magnetic tape. Therefore, for example, JP 2003-173508 A proposes a technique of reading jogging servo signals, which have been written in the data tracks of the magnetic tape, by chips of the individual heads and then driving jogging actuators for the individual head chips based on the read signals to thereby control the jogging of the head chips.

In addition, JP 2001-35046 A discloses a technique of, in a running state of a flexible tape such as a magnetic tape, detecting width of the tape contactlessly at high precision and then controlling the tension of the magnetic tape so that the detected tape width becomes a targeted tape width. However, this is a technique of performing the detection of tape width as well as the control of the tape tension in the running state in order to achieve stable running and uniform take-up of the magnetic tape. That is, the technique is other than to control the tape tension in consideration of influences exerted on the tracking precision by such variations in the magnetic tape width or errors of the relative positions among the individual magnetic heads as described above.

For magnetic tapes, as described above, there is a tendency that the data track width will decrease more and more from this time on under the trend toward higher recording densities. As a result of this, there has emerged a fear that correct reading of data may be unachievable because of significant increases in deviation of the positional relation between magnetic head and data track, i.e., differences between servo track—data track distance and servo head—recording/reproducing head distance in the tape width direction caused by not only widthwise swings of the tape during recording and reproducing operations as described above but also occurrence of widthwise size changes of the magnetic tape due to changes in temperature, humidity and the preservation state of the tape. This point is described in detail below.

In conventional recording/reproducing method for magnetic tapes, data recording is performed at a specified recording track width. Preferably, this recording track width is as smaller as possible because the number of tracks on the magnetic tape can be increased so that the recording capacity is increased. On the other hand, a lower limit value for the recording track width is determined naturally from considerations of the tracking servo precision, dimensional differences due to differences in expansion coefficient between head unit and magnetic tape caused by temperature and humidity variations, changes in tape width due to the leaving after taking-up, and the like. As the recording track width decreases beyond this lower-limit value, the reproducing head becomes more likely to be misaligned from the recording track, which causes data signal reading to become usable, leading to increases in error rate. In order to allow larger margins of track misalignment during data reproduction, normally, the recording track width is so designed as to be larger than the track width relative to the reading reproducing head. Therefore, there occurs no problem only if the relative position between recording track and reproducing head after tracking servo falls within the margin range.

Among the factors of the relative position shifts between recording track and reproducing head, the widthwise swing of the tape during the running can be managed with improvement of the performance of the tracking servo. However, if there occur the dimensional differences and tape width changes due to the leaving after taking-up, caused by differences in expansion coefficient between head unit and magnetic tape owing to temperature and humidity variations, that is, if the difference between a distance from a servo head to the data head located farthest from the servo head (e.g., servo head 12a and data head 11b, or servo head 12b and data head 11a shown in FIG. 2) and its corresponding distance from the servo track and the data track becomes a significant value relative to the aforementioned margin, those differences would matter irrespectively of the performance of the tracking servo.

For instance, if the above-mentioned distance from a servo head to the data head located farthest from the servo head is 2500 μm, the recording head width is 20 μm and the track width of the reproducing head is 12 μm, then the difference margin of the reproducing head is only 4 μm or so on one side relative to the reference position. With respect to expansions of the head unit and the magnetic tape due to temperature and humidity, the difference due to humidity is larger, and therefore from the viewpoint of humidity expansion coefficient, in the case of a magnetic tape having a humidity expansion coefficient of $2 \times 10^{-5}$/% RH, a humidity change of 40% RH during a reproduction relative to a recording would cause a difference of 2.0 μm at a maximum in this system. On this account, whereas data tracks in the vicinity of the servo track bear no problem with amplitudes of up to about 8 μm against in-running widthwise swings of the tape, the data track located farthest from the servo track undergoes a decrease of amplitude allowance to about 4 μm. This would considerably matter in further enhancement of the recording density of magnetic tapes in the future.

As a solution to such problems, the method described in JP 2003-173508 A has been proposed. However, in this method, since the jogging servo signals are written in the data tracks of the magnetic tape, data recording area inevitably decreases correspondingly. This would form an obstacle to implementing magnetic tapes of high recording density.

SUMMARY OF THE INVENTION

The present invention having been accomplished in view of these and other problems, an object of the invention is to provide a recording/reproducing method and a recording/reproducing apparatus for magnetic tapes, the method and apparatus capable of correctly recording and reproducing data without causing errors even with occurrence of size changes in the widthwise direction of a magnetic tape as a recording and reproducing technique suitable for recording density enhancement of magnetic tapes.

In order to achieve the above object, the present invention provides a recording/reproducing method for magnetic tapes in which data tracks and servo tracks are provided, in which data reproduction is performed while tape tension is controlled so that a tape width during data reproduction is maintained equal to a tape width during data recording. More specifically, first, a tape width is detected and a value of the tape width is stored during data recording. Next, a tape width is re-detected during data reproduction. Then, the tape width detected in the data reproduction is compared with the tape width stored in the data recording, and data is reproduced while tape tension is controlled in such a manner that the tape width during data reproduction is maintained equal to the tape width during data recording.

Further, a recording/reproducing apparatus for magnetic tapes for use in carrying out the invention method includes means for detecting a magnetic tape width, means for storing the tape width, means for reading the stored tape width, means for comparing the tape width in data recording and the tape width in data reproduction with each other, and means for controlling tape tension.

According to the present invention, even if the magnetic tape has changed in size, the tape width during data recording can be maintained constant by the tension control exerted during data reproduction. Thus, there occurs no track displacement between recording track and reproducing head, making it implementable to fulfill data recording without errors.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Figure 1:
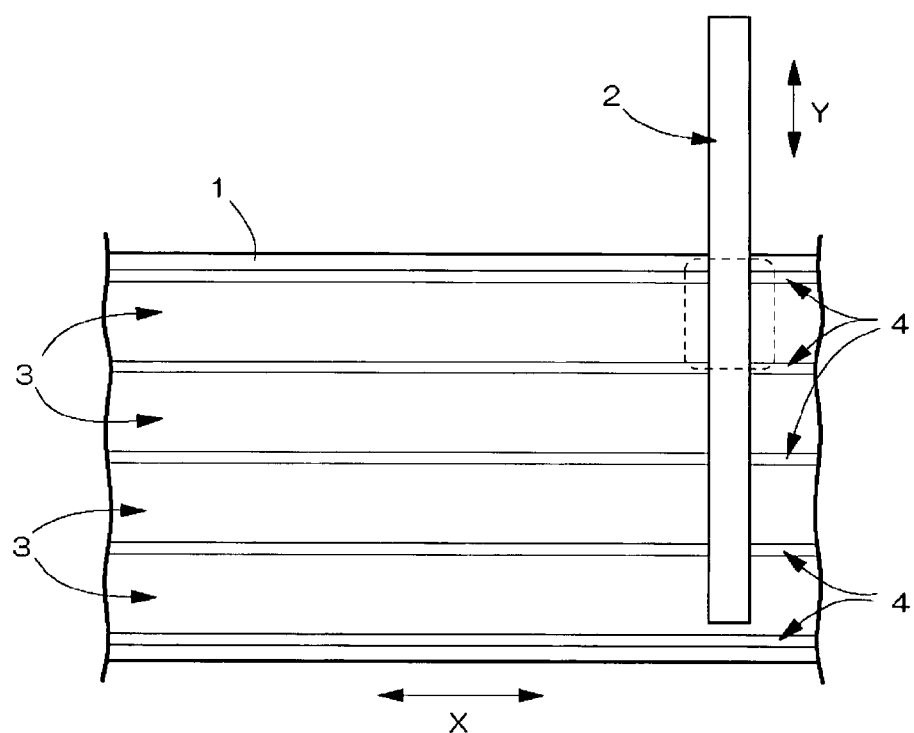
FIG. 1 is an outlined view showing an example of the tracking servo method to be used for recording and reproduction of magnetic tapes.

The present invention is targeted for recording/reproducing methods and recording/reproducing apparatuses for recording and reproducing data while performing servo tracking on a magnetic tape having data tracks and servo tracks. The tracking servo method in this case may be either a magnetic servo method or an optical servo method. Below given is a description on a case where the present invention is applied to a system in which data recording and reproducing is performed while servo tracking is being performed on the magnetic tape 1 by the magnetic servo method by using the head unit 2 as shown in foregoing FIGS. 1 and 2. However, even in the case of the optical servo method, basically, the present invention may be carried out with the same structure as shown below.

Figure 4:
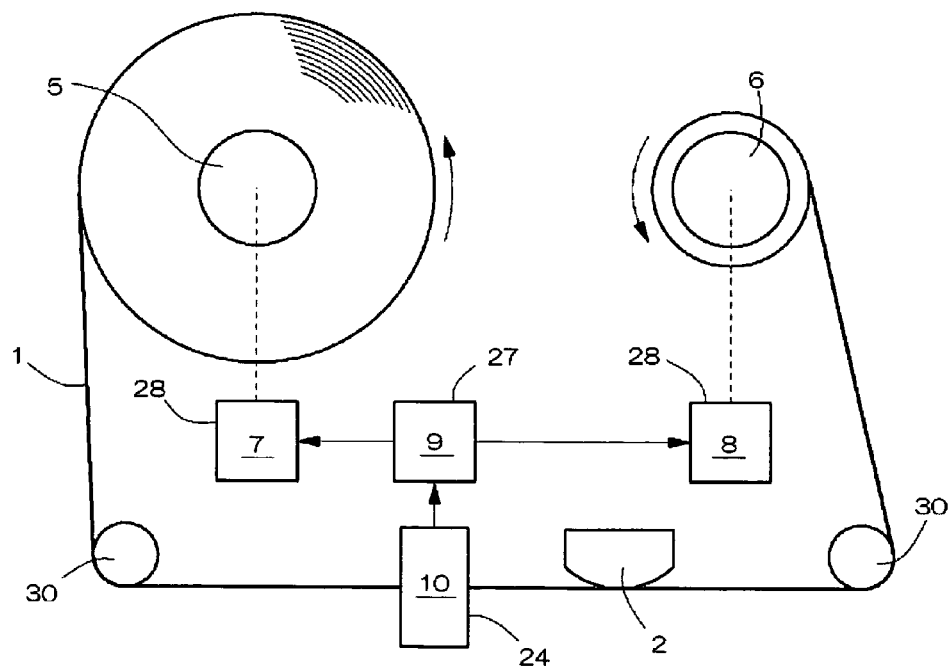
FIG. 4 is a block diagram showing an example of the configuration of a recording/reproducing apparatus for magnetic tapes according to an embodiment of the invention.

First, the magnetic tape recording/reproducing system to which the present invention is applied is briefly explained. FIG. 4 is an outlined structural view showing an example of such a recording/reproducing system. As shown in FIG. 4, the magnetic tape recording/reproducing system includes a tape feed unit 5 for feeding out the magnetic tape 1, a take-up unit 6 for taking up the magnetic tape 1, a feed motor 7 for driving the tape feed unit 5, a take-up motor 8 for driving the take-up unit 6, and a motor controller 9 for controlling the individual motors 7 and 8. By controlling the individual motors 7 and 8, the motor controller 9 can control the tape feed speed of the tape feed unit 5 and the take-up speed of the take-up unit 6.

Between the tape feed unit 5 and the take-up unit 6, and along the tape running path from the former to the latter, the head unit 2 for performing data recording and reproduction with the magnetic tape 1, a plurality of guide rollers 30 for guiding the magnetic tape 1 along a specified direction, and a tape width measuring instrument 10 for detecting the tape width of the magnetic tape 1 (means 24 for detecting the tape width). Then, the magnetic tape 1 is made to run from the tape feed unit 5 toward the take-up unit 6, and data recording and reproduction with the magnetic tape 1 is performed by the head unit 2 while the servo tracking by the magnetic servo method is in progress. In this case, magnetic tape width is detected by the tape width measuring instrument 10 in both recording and reproduction of data.

Figure 5:
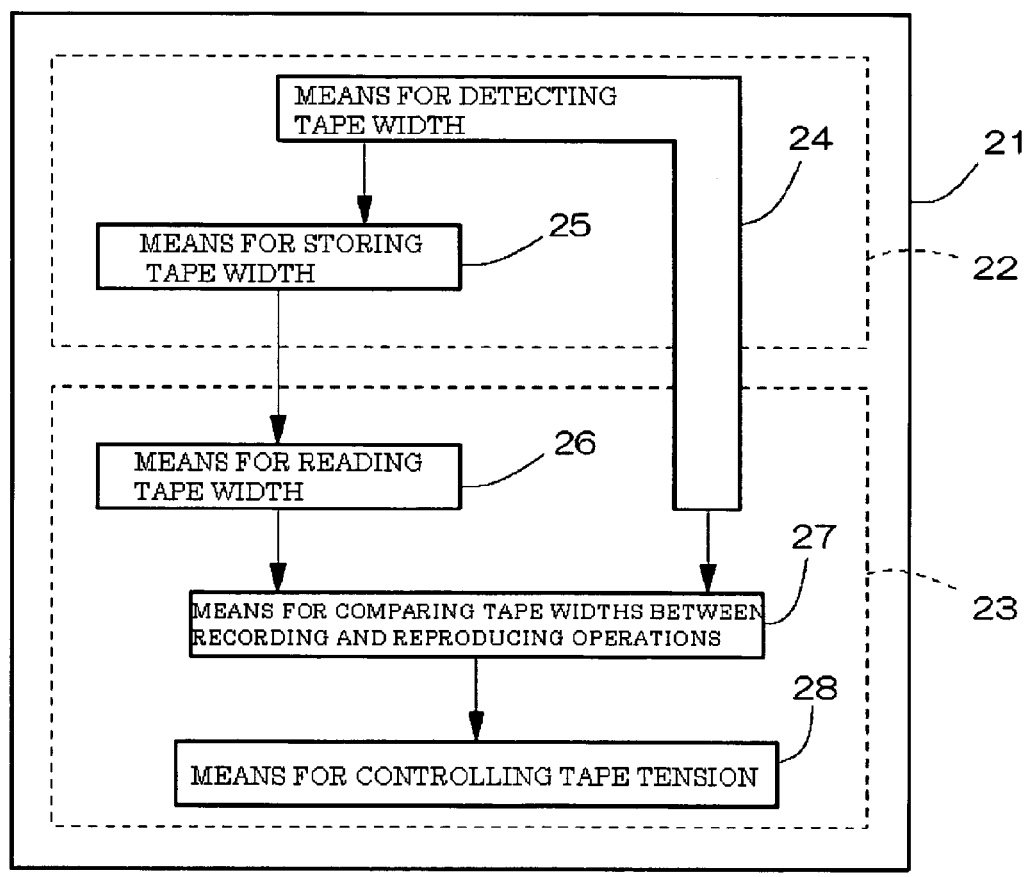
FIG. 5 is an outlined structural view showing an example of a recording/reproducing system for magnetic tapes to which the invention is applied.

Next, a magnetic tape recording/reproducing apparatus according to the present invention, which is applicable to such system as shown above is explained. As shown in FIG. 5, the magnetic tape recording/reproducing apparatus 21 includes a means 24 for detecting magnetic tape width, a means 25 for storing the tape width, a means 26 for reading the tape width, a means 27 for making a comparison between the tape width in data recording and the tape width in data reproduction (means for comparing the tape widths between recording and reproduction operations), and a means 28 for controlling tape tension. In addition, in FIG. 5, a data recording state 22 and a data reproducing state 23 are surrounded by broken lines, respectively, to allow an intuitive grasping of timings at which individual means are involved.

Figure 2:
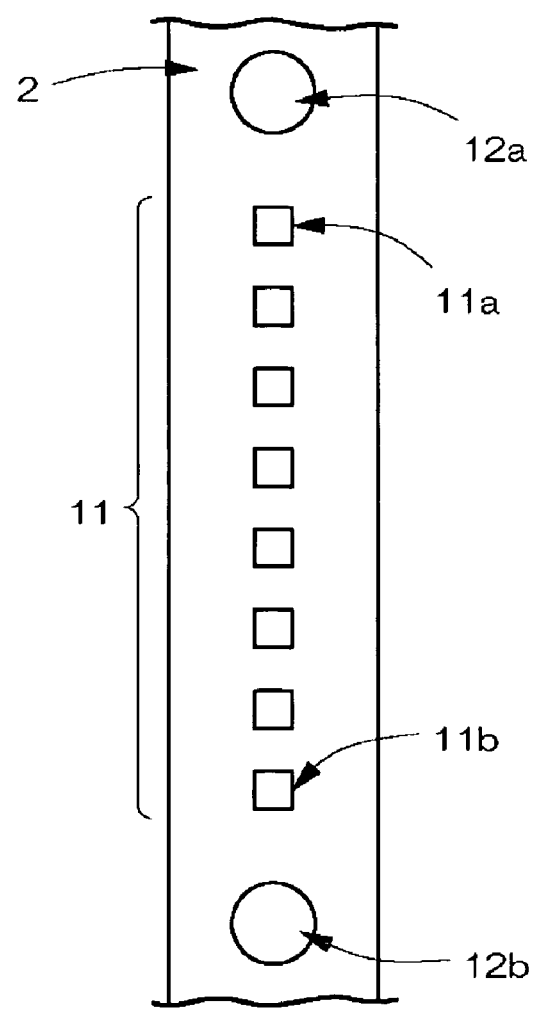
FIG. 2 is a schematic enlarged view showing an example of the arrangement configuration of the head provided on the head unit of FIG. 1.

The means 24 for detecting magnetic tape width, may be implemented by conventionally known means, which is exemplified by a technique that position detection sensors for monitoring both edges of the magnetic tape 1, respectively, are placed on the running path of the magnetic tape 1, or a technique that with at least two particular servo tracks provided on the magnetic tape 1, variations of the distance between the two servo tracks are determined from servo signals read by the servo heads 12a and 12b on the head unit 2 as shown in FIG. 2 and then the value of the tape width is obtained from the relationship between the inter-servo-track distance and the tape width.

It is noted that on condition that means for detecting the tape width without using the head unit is the used, providing position detection sensors for monitoring both edges of the magnetic tape 1 on a substrate made of the same material as the head unit makes it possible to manage fine size changes of the head unit due to temperature or the like.

The means 25 for storing the tape width and the means 26 for reading the tape width are implemented by conventionally known means, which is exemplified by providing a storage element such as semiconductor memory in the cartridge itself of the magnetic tape cartridge having the magnetic tape housed therein (in the casing itself in which the magnetic tape is housed), or providing a place for storage in part of the magnetic tape (e.g., a portion forward of data recording/reproducing portion of the tape in its longitudinal direction) so that an exclusive or bi-use magnetic head is used for storage and reading.

The means 27 for comparing tape widths between recording and reproducing operations may be implemented by conventionally known means, which is exemplified by a process including detecting a magnetic tape width at all times or from time to time by means for detecting the magnetic tape width during data reproduction and then comparing, by a comparison operation circuit, the tape widths in data recording stored on the storage element included in the foregoing cartridge or on the magnetic tape with values read by the means 26 for reading the tape width, and further sending a control signal to the means 28 for controlling tape tension.

The means 28 for controlling tape tension may be implemented by conventionally known means, which is exemplified by a means for controlling the torques of the feed reel and the take-up reel, or a means for providing pinch-roll capstans on both sides of the tape running system with the head unit sandwiched therebetween to control their rotational speeds and thereby control the tension.

The recording/reproducing method for magnetic tapes according to the present invention is to perform data recording and reproduction while detecting the magnetic tape width in both recording and reproduction of data for the magnetic tape 1 in the following manner with the use of such the recording/reproducing apparatus as described above.

First, in data recording, magnetic tape width is detected at all times or from time to time by the means 24 for detecting magnetic tape width. The resulting tape widths are stored on the storage element included in the cartridge or on the magnetic tape 1 at all times or from time to time by the means 25 for storing tape widths, together with positional information of the tape in its longitudinal direction.

Figure 3:
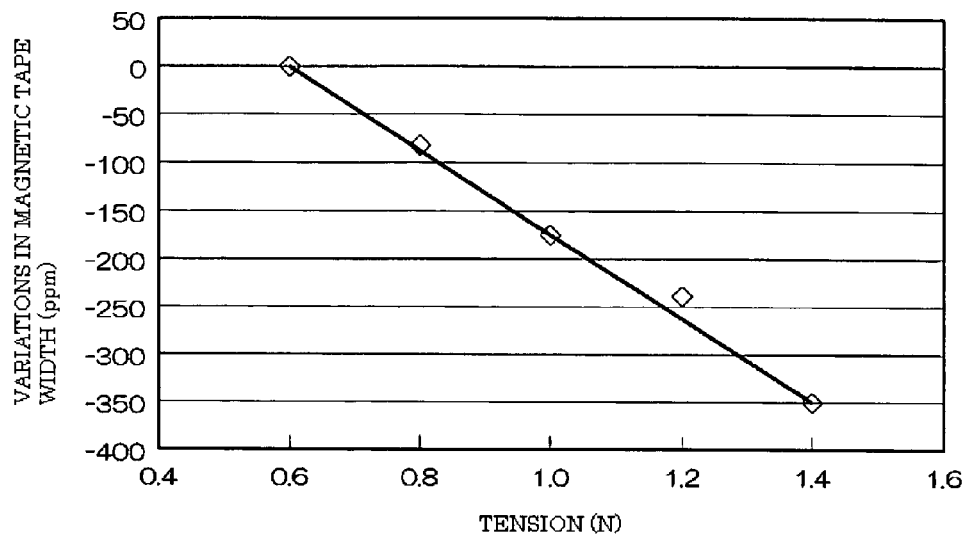
FIG. 3 is a graph showing an example of the correlation between tape tension and tape width according to an embodiment of the invention.

Next, in data reproduction, the magnetic tape width is detected by the means 24 for detecting a magnetic tape width, at all times or from time to time. Concurrently with this, tape widths in data recording stored on the storage element included in the cartridge or on the magnetic tape 1 are read by the means 26 for reading a tape width (tape width measuring instrument 10 in FIG. 4), and further tape widths in recording and reproducing operations are compared therebetween at various positions of the tape in its longitudinal direction by the means 27 for comparing tape widths between recording and reproducing operations. Based on these results, tape tension is controlled in response to the tape width by the means 28 for controlling tape tension, so that the tape width is maintained equal to the tape width in recording operation. Generally, as shown in FIG. 3, there can be seen a correlation between tape tension and tape width change, so that the tape width can be controlled by controlling the tape tension. With such measures, even if the tape width has changed relative to that of data recording due to environmental conditions (temperature, humidity) in data reproduction, and the preservation condition of the tape, data tracks can be reproduced with the tape width in data recording. Thus, no track displacement occurs during data reproduction, so that reproduction without errors become implementable.

As described above, according to the present invention, data recording and reproduction is performed in such a manner that that even when the magnetic tape has changed in size, tape tension is controlled so that the tape width during data reproduction is maintained equal to that of data recording. Thus, even with changes in use environments or tape preservation conditions, the distance between servo track and data track is maintained constant at all times, making it implementable to reproduce data without causing errors. As a consequence of this, a recording/reproducing method and a recording/reproducing apparatus for magnetic tapes suitable for recording density enhancement can be realized.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A recording/reproducing method for magnetic tapes in which data tracks and servo tracks are provided, comprising the steps of:

detecting a tape width during data recording to store a value of the tape width, re-detecting a tape width during data reproduction while reading the tape width stored in the data recording, comparing the tape width detected in the data reproduction and the tape width stored in the data recording with each other, and reproducing data while controlling tape tension in such a manner that the tape width during data reproduction is maintained equal to the tape width during data recording.

2. A recording/reproducing apparatus for magnetic tapes in which data tracks and servo tracks are provided, comprising: means for detecting a magnetic tape width at the time of data recording, means for storing the detected tape width, means for reading the stored tape width, means for comparing the detected tape width in data recording and a tape width detected at a time of data reproduction with each other, and means for controlling tape tension based on the comparison.

* * * * *